United States Patent [19]
Gosens et al.

[11] Patent Number: 5,380,795
[45] Date of Patent: Jan. 10, 1995

[54] POLYMER MIXTURE COMPRISING AN AROMATIC POLYCARBONATE, A STYRENE-CONTAINING COPOLYMER AND/OR GRAFT POLYMER, AND A POLYSILOXANE-POLYCARBONATE BLOCK COPOLYMER, AND ARTICLES FORMED THEREFROM

[75] Inventors: Johannes C. Gosens, Roosendaal; Adelbert H. Leonardus, Bergen op Zoom; Hendrikus J. Eugene, Roosendaal, all of Netherlands

[73] Assignee: General Electric Company, Pittsfield, Mass.

[21] Appl. No.: 157,349

[22] Filed: Nov. 23, 1993

[30] Foreign Application Priority Data

Dec. 2, 1992 [NL] Netherlands ............... 9202090

[51] Int. Cl.⁶ .................. C08L 69/00; C08L 25/04
[52] U.S. Cl. ......................... 525/67; 525/92; 525/147; 525/464
[58] Field of Search ............... 525/67, 92, 147, 464

[56] References Cited

U.S. PATENT DOCUMENTS

| | | | |
|---|---|---|---|
| 3,419,634 | 12/1968 | Vaughn | 528/25 |
| 4,788,252 | 11/1988 | de Boer | 525/67 |

FOREIGN PATENT DOCUMENTS

| | | |
|---|---|---|
| 0135794 | 4/1985 | European Pat. Off. . |
| 0472911 | 3/1992 | European Pat. Off. . |
| 0500087 | 8/1992 | European Pat. Off. . |
| 0501347 | 9/1992 | European Pat. Off. . |
| 0517927 | 12/1992 | European Pat. Off. . |
| 524731 | 1/1993 | European Pat. Off. ............ 525/464 |
| 4016417 | 11/1991 | Germany ............ 524/141 |
| 292359 | 12/1991 | Japan ............ 525/464 |
| WO-A-9212208 | 7/1992 | WIPO . |

OTHER PUBLICATIONS

Patent Abstracts of Japan, deel 16, nr. 126 (C-923), 31 maart 1992, & JP,A,3292359 (Mitsubishi Gas Chem. Co. Inc.) 24 Dec. 1991, zie samenvatting.
WO,A,9212208 Abstract.

*Primary Examiner*—David Buttner

[57] ABSTRACT

The invention relates to a polymer mixture which comprises an aromatic polycarbonate, a styrene-containing copolymer and/or a styrene-containing graft polymer and a given type of polysiloxane-polycarbonate block copolymer. It has been found that the use of this given type of polysiloxane-polycarbonate block copolymer leads to a polymer mixture having improved impact strength properties. The polysiloxane-polycarbonate block copolymer used is built up from (a) 1–50% by weight of polysiloxane blocks of formula II and
(b) 50–99% by weight of polycarbonate blocks of formula III, wherein $R_1$, $R_2$, $R_3$, $R_4$, $R_5$ and $R_6$ each independently of each other represent a hydrogen atom, a hydrocarbyl or a halogenated hydrocarbyl, D is an integer from 5–140, Y is a hydrogen atom or an alkoxy, and wherein A is a bivalent hydrocarbon group having 1–15 carbon atoms, which bivalent hydrocarbon group may be substituted, is an —S—; an —S—S—; an —S—(O)—; an —S(O)$_2$—; an —O—, or a —C— and each X independently of each other is a hydrogen atom, a halogen or a monovalent hydrocarbon (see Figures).

10 Claims, No Drawings

POLYMER MIXTURE COMPRISING AN AROMATIC POLYCARBONATE, A STYRENE-CONTAINING COPOLYMER AND/OR GRAFT POLYMER, AND A POLYSILOXANE-POLYCARBONATE BLOCK COPOLYMER, AND ARTICLES FORMED THEREFROM

The invention relates to a polymer mixture which comprises an aromatic polycarbonate without polysiloxane blocks (A), a styrene-containing copolymer and/or a styrene-containing graft polymer (B) and a polysiloxane-polycarbonate block copolymer (C).

DESCRIPTION OF THE RELATED ART

Polymer mixtures which comprise an aromatic polycarbonate, a styrene-containing graft polymer, for example, ABS and a polysiloxane-polycarbonate block copolymer are disclosed in EP-A-0135794. According to this prior art a polysiloxane-polycarbonate block copolymer is used which comprises polysiloxane blocks of formula (I)

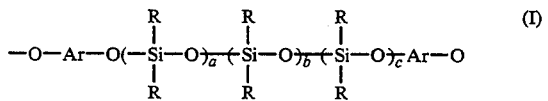

In this formula I, Ar is an arylene radical obtained from a diphenol. According to EP-A-0135794 block copolymers are used which comprise 2.5–25% by weight of polysiloxane blocks of formula I and 97.5–75% by weight of blocks having a polycarbonate structure. When the polymer mixture according to EP-A-0135794 comprises a mixture of a polysiloxane-polycarbonate block copolymer and a polycarbonate without polysiloxane blocks, the content of polysiloxane blocks in this mixture must be between 2.5 and 25% by weight.

SUMMARY OF THE INVENTION

The invention is a polymer mixture which comprises (A) an aromatic polycarbonate without polysiloxane blocks, (B) a (i) styrene-containing copolymer, (ii) styrene-containing graft polymer having a rubber-like graft base, or (iii) a mixture of components (i) and (ii), and (C) a polysiloxane-polycarbonate block copolymer.

The invention is based on the discovery that polymer mixtures having improved properties can be obtained by using certain polysiloxane-polycarbonate block copolymers. More in particular, polymer mixtures having a better impact strength can be obtained in this manner.

DESCRIPTION OF THE PREFERRED EMBODIMENTS

In the polymer mixture according to the invention a polysiloxane-polycarbonate block copolymer is used which is built up from (a) 1–50% by weight of polysiloxane blocks of formula (II)

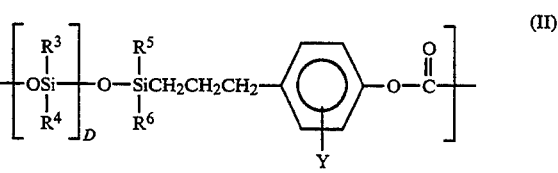

and (b) 50–99% by weight of polycarbonate blocks of formula (III)

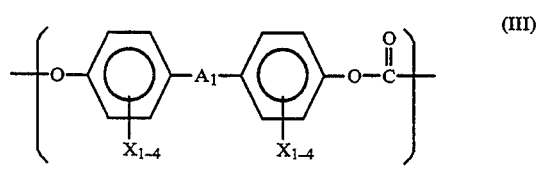

wherein $R_1$, $R_2$, $R_3$, $R_4$, $R_5$ and $R_6$ in formulae II and III each independently of each other represent a hydrogen atom, a hydrocarbyl or a halogenated hydrocarbyl, D is an integer from 5 to 140, Y is a hydrogen atom or an alkoxy, and wherein $A_1$ is a bivalent hydrocarbon group having 1–15 carbon atoms, which bivalent hydrocarbon group may be substituted, an —S—; an —S—S—; an —S(O)—; an —S(O)$_2$; an —O—, or a —C— and every X independently of each other is a hydrogen atom, a halogen or a monovalent hydrocarbon.

It is possible to use in the polymer mixture according to the invention polysiloxane-polycarbonate block copolymers of the type just mentioned with polycarbonate blocks which are built up for 75–99% by weight from units of the above-mentioned formula III and for 1–25% by weight from aliphatic diester units of formula (IV):

wherein $A_2$ is an alkylene radical having 6–18 carbon atoms and A1 and X have the meanings given hereinbefore.

The polymer mixture according to the invention is preferably composed so that, per 100 parts by weight of constituent A plus constituent B plus constituent C, it is built up from

- 50–90% by weight, more preferably 60–80% by weight of constituent A and
- 2–40% by weight, more preferably 5–20% by weight of constituent B and
- 2–40% by weight, more preferably 5–20% by weight of constituent C, constituent B comprising 50–100% by weight of the graft copolymer and 0–50% by weight of the copolymer.

It is preferable for the content of polysiloxane units in constituent C plus the content of rubber-like graft base in constituent B together, calculated with respect to the overall quantity by weight of the constituents A plus B plus C, to be between 2.5 and 25% by weight.

As a styrene-containing graft polymer having a rubber-like graft base is preferably used in the polymer mixture according to the invention a graft polymer obtained by grafting a mixture of (1) styrene and/or alpha-methyl styrene and/or a styrene substituted in the aromatic nucleus and (2) a methacrylonitrile and/or acrylonitrile and/or maleic acid anhydride and/or derivative of maleic acid anhydride and/or acrylic monomer, on a rubber (3).

As a styrene-containing copolymer, the polymer mixture according to the invention may comprise a copolymer which is built up from (1) styrene, and/or alpha-methyl styrene and/or a styrene substituted in the aromatic nucleus and (2) a methacrylonitrile and/or acrylonitrile and/or maleic acid anhydride and/or derivative of maleic acid anhydride and/or acrylic monomer.

The polymer mixture according to the invention may comprise a mixture of a styrene copolymer and a styrene graft polymer as described hereinbefore.

The invention also relates to articles formed from the polymer mixture according to the invention.

The polymer mixture according to the invention comprises at any rate the following constituents:

A. an aromatic polycarbonate, and
B. a styrene-containing copolymer and/or a styrene-containing graft polymer, and
C. a polysiloxane-polycarbonate block copolymer.

The polymer mixture according to the invention may moreover comprise one or more of the following constituents:

D. flame-retardants
E. conventionally used additives.

A. Aromatic Polycarbonates Without Polysilixane Blocks

Aromatic polycarbonates are materials known per se. They are generally prepared by reacting a dihydric phenol compound with a carbonate precursor, for example, phosgene, a halogen formiate or a carbonate ester. Aromatic polycarbonates are polymers which comprise units of formula (V)

(V)

wherein $A_3$ is a bivalent aromatic radical which is derived from the dihydric phenol which has been used in the preparation of the polymer. Mononuclear or polynuclear aromatic compounds which comprise two hydroxy radicals each directly bonded to a carbon atom of an aromatic nucleus may be used as dihydric phenols in the preparation of the aromatic polycarbonates.

The branched polycarbonates known per se as described, for example, in U.S. Pat. No. 4,001,184 are also suitable.

The so-called polyester carbonates which are obtained by performing the polymerisation reaction in the presence of an ester precursor, for example, a difunctional carboxylic acid, for example, terephthalic acid or an ester-forming derivative thereof, are also suitable aromatic polycarbonates. These polyester carbonates have ester compounds and carbonate compounds in the polymeric chain. Polyester carbonates are described, for example, in U.S. Pat. No. 3,169,121.

It is also possible to use a mixture of different polycarbonates.

B. Styrene-Containing Copolymer and/or a Styrene-Containing Graft Polymer Having a Rubber-Like Graft Base Suitable styrene-containing copolymers and suitable styrene-containing graft polymers are described, for example, in EP-A-0174493 and in EP-A-0135794.

Styrene-containing copolymers are copolymers built up from units derived from (1) styrene, and/or alpha-methyl styrene and/or styrene compounds substituted in the aromatic nucleus and (2) acrylonitrile and/or methacrylonitrile and/or maleic acid anhydride and/or a derivative of maleic acid anhydride and/or acrylic monomer. Suitable derivatives of maleic acid anhydride are maleimide and N-phenyl maleimide. Suitable acrylic monomers are, for example, methyl methacrylate, (meth)acrylic acid. These copolymers are known per se and they can be obtained according to conventionally used methods of preparing copolymers.

Styrene-containing graft polymers are obtained by grafting a mixture of at least two monomers on a rubber-like graft base. Suitable graft bases are, for example, poly-butadiene, butadiene-styrene copolymers. Other rubbers, for example, acrylate rubbers and EPDM rubbers may also be considered. A mixture of monomers is then grafted on the said rubbers. Suitable monomers are claimed in claim 5.

C. Polysiloxane-Polycarbonate Block Copolymers

The polymer mixture according to the invention comprises a polysiloxane-polycarbonate block copolymer as claimed in claim 1 or claim 2 of the present Patent Application. Block copolymers as claimed in claim 1 and their mode of preparation are disclosed in EP-A-92305883, filed on Jun. 25, 1992 and having a U.S. priority date of Jul. 1, 1991, filing number 724022 (abandoned) as Ser. No. 08/108,946 (pending).

Block copolymers as claimed in claim 2 and their mode of preparation are disclosed in EP-A-92305886, filed on Jun. 25, 1992 and having a U.S. priority date of Jul. 1, 1991, filing number 724018 (abandoned) and continued as Ser. No. 08/204,699 (pending).

Polymer mixtures of polycarbonates and block copolymers as used in the invention are disclosed in EP-A-92305885, filed on Jun. 25, 1992 and having a U.S. priority date of Jul. 1, 1991, filing number 724,023 (abandoned) and continued as Ser. No. 08/026,485 (pending).

All the polysiloxane-polycarbonate block copolymers described in the three Patent Applications mentioned hereinbefore may be used in the polymer mixture according to the invention.

E. Flame-retardants

The polymer mixture according to the invention may comprise one or more flame-retardants. All the conventionally used agents suitable to improve the flame-retarding properties of polycarbonate polymers and/or of styrene-containing copolymers or graft polymers may be considered. By way of example may be mentioned:

a salt having flame-retarding properties for aromatic polycarbonates
a halogen-containing low-molecular and/or high-molecular compound and/or
a perfluoroalkane polymer and/or
metal compound active as a synergist
poly(aryl-arylene phosphates) or poly(alkaryl-arylene phosphates) as described in EP-A-0363608.

Salts having flame-retarding properties are generally known and are used on a large scale in polymer mixtures which comprise a polycarbonate. All the salts which are suitable for polymer mixtures having a polycarbonate may be used in the polymer mixture according to the invention. In particular may be mentioned organic and inorganic sulphonates, for example, sodium trichlorobenzenesulphonate, salts of sulphone sulphonates, for example, the potassium salt of diphenyl sulphone sulphonate, salts of perfluorinated alkane sulphonic acids and sodium aluminium hexafluoride.

Examples of suitable halogen-containing compounds are decabromodiphenyl ether, octabromodiphenyl, octabromodiphenyl ether and further oligomeric or polymeric bromine compounds, for example, derived from tetrabromobisphenol A or also poly-phenylene ethers brominated in the nucleus.

Tetrafluoroethylene polymers are preferably used as perfluoroalkane polymers. The polymer mixture according to the invention may further comprise a metal or metal compound active as a synergist, for example, antimony oxide and the like. These synergists are conventionally used in combination with halogen-containing compounds.

E. Conventionally Used Additives

In addition to the constituents mentioned hereinbefore the polymer mixture according to the invention may comprise one or more conventionally used additives, for example, fillers, reinforcing fibres, stabilisers, pigments and dyes, plasticisers, mould-release agents and antistatically active agents.

The polymer mixture may be obtained according to the conventionally used methods of preparing polymer mixtures, for example, by compounding the said constituents in an extruder.

The polymer mixture according to the invention may comprise
  D. 0–20 parts by weight of one or more agents to improve the flame-retarding properties and/or
  E. 0–100 parts by weight of conventionally used additives per 100 parts by weight of A+B+C.

Comparative Examples A to F; Examples I to VIII.

In the following examples A, I, II and III the following constituents were used:

PC-1: an aromatic polycarbonate homopolymer derived from bisphenol A and phosgene without polysiloxane blocks having a weight-averaged molecular weight of 25,500.

PC-2: an aromatic polycarbonate homopolymer derived from bisphenol A and phosgene without polysiloxane blocks having a weight-averaged molecular weight of 28,000.

ABS: A graft copolymer, built up substantially from a butadiene rubber on which styrene and acrylonitrile have been grafted, having a rubber content of approximately 50% by weight.

SAN-1: A styrene-acrylonitrile copolymer having a weight-ratio styrene:acrylonitrile of 72:28 and having a weight-averaged molecular weight of 100,000.

SAN-2: A styrene-acrylonitrile copolymer having a weight ratio styrene: acrylonitrile of 72:28 and having a weight-averaged molecular weight of 130,000.

LR: A polysiloxane-polycarbonate block copolymer having 43% by weight of polysiloxane blocks of formula I (see above) and having 57% by weight of polycarbonate blocks of formula III. All R's in formula I represent a methyl group; Ar is an arylene group derived from bisphenol A, and the sum of a+b+c is on an average 10. The weight-averaged molecular weight of LR is approximately 60,000.

XT-1: A polysiloxane-polycarbonate block polymer having 43% by weight of polysiloxane blocks of formula II (see above) and having 57% by weight of polycarbonate blocks of formula III. (see above). R1 and R2 all represent a methyl group, D is on an average 10 and Y is a hydrogen atom. A1 in formula II represents a 2,2-propyl group and X is a hydrogen atom. The weight-averaged molecular weight of XT-1 is approximately 50,000.

XT-2: A polysiloxane-polycarbonate block polymer having 20 by weight of polysiloxane blocks of formula II (see above) and having 80% by weight of polycarbonate blocks of formula III (see above). $R_1$ and $R_2$ all represent a methyl group, D is on an average 50 and Y is a hydrogen atom. A in formula III is a 2,2-propyl group and X is a hydrogen atom. The weight-averaged molecular weight of XT-2 is approximately 30,000.

Various polymer mixtures were prepared from the constituents mentioned hereinbefore in the quantities recorded hereinafter in Tables A and B. The examples A to F relate to comparative prior art examples; the examples I to VIII relate to polymer mixtures according to the present invention. The various polymer mixtures were prepared by compounding the indicated constituents in an extruder. The resulting extrudate was then pelletised. Standardized test rods were injection-moulded from the pellets so as to determine the Izod notched impact strength at different temperatures (according to ASTM D 256) and to determine the notched impact strength according to the Charpy test (DIN 53453).

The melt viscosity index was also determined according to ISO 1133.

The results are recorded hereinafter in Tables A and B.

TABLE A

| Example | A | B | C | I | II | III |
|---|---|---|---|---|---|---|
| Composition (parts by weight) | | | | | | |
| Formulation No. | 73 | 74 | 76 | 81 | 83 | 85 |
| PC-1 | 60 | 55 | 58 | 48 | 55 | 58 |
| SAN-1 | 22 | 22 | 22 | 22 | 22 | 22 |
| ABS | 18 | 18 | 10 | 10 | 18 | 10 |
| LR | — | 5 | 10 | — | — | — |
| XT-1 | — | — | — | — | 5 | 10 |
| XT-2 | — | — | — | 20 | — | — |
| Rubber content (wt. %) | 9.0 | 11.3 | 9.3 | 9.0 | 11.3 | 9.3 |
| Properties MVI 260° C. C/5 kg | 12 | 16 | 80 | 19 | 12 | 14 |
| Izod notched impact value | | | | | | |
| +23° C. | 570 | 540 | 220 | 530 | 620 | 620 |
| −20° C. | 390 | 270 | 50 | 520 | 500 | 490 |
| −49° C. | 200 | 120 | 30 | 430 | 290 | 280 |
| Charpy notched impact value | | | | | | |

TABLE A-continued

| Example | A | B | C | I | II | III |
|---|---|---|---|---|---|---|
| +23° C. | 29 | 32 | 16 | 54 | 43 | 41 |

*rubber content: calculated from the polybutadiene content in the ABS and the polysiloxane content in LR, XT-1 or XT-2; expressed as a percentage by weight with respect to the polymer mixture.

TABLE B

| Example | D | E | F | IV | V | VI | VII | VIII |
|---|---|---|---|---|---|---|---|---|
| Composition (parts by weight) | | | | | | | | |
| Formulation No. | 91 | 92 | 93 | 94 | 95 | 96 | 97 | 98 |
| PC-2 | 57 | 60 | 64 | 58 | 60 | 54 | 58 | 39 |
| SAN-2 | 25 | 25 | 25 | 25 | 25 | 25 | 25 | 25 |
| ABS | 18 | 10 | 6 | — | 10 | 10 | 6 | — |
| LR | — | 5 | 5 | 17 | — | — | — | — |
| XT-1 | — | — | — | — | 5 | — | — | — |
| XT-2 | — | — | — | — | — | 11 | 11 | 36 |
| Rubber content (wt. %) | 9.0 | 7.2 | 5.2 | 7.2 | 7.2 | 7.2 | 5.2 | 7.2 |
| Properties MVI 260 C/5 kg | 11 | 20 | 29 | 16 | 15 | 17 | 18 | 20 |
| Izod notched impact value | | | | | | | | |
| +23° C. | 570 | 480 | 510 | 540 | 620 | 670 | 650 | 480 |
| −20° C. | 480 | 150 | 150 | 470 | 530 | 600 | 560 | 890 |
| −40° C. | 280 | 150 | 80 | 370 | 210 | 170 | 190 | 570 |
| Charpy notched impact value | | | | | | | | |
| +23° C. | 19 | 16 | 30 | 38 | 45 | 44 | 46 | 31 |

*Rubber content: see remark sub Table A

It may be seen from Table A that the addition of a conventional polysiloxane-polycarbonate block copolymer (comparative examples B and C) leads to a considerable deterioration of the impact strength. This applies to the notched impact value according to Izod at all the indicated temperatures and to the notched impact value according to Charpy. The melt viscosity index also increases. Better notched impact values are nearly always obtained in the examples according to the invention (I, II and III), better than those determined in comparative example A without polysiloxane-polycarbonate block copolymer and at any rate always many times better than in the comparative examples B and C with the conventionally used polysiloxanepolycarbonate block copolymers. The melt viscosity index increases less strongly.

In the examples according to Table B another polycarbonate (with higher molecular weight) and another styrene-acrylonitrile copolymer (with higher molecular weight) were used. The results show a picture similar to that of Table A.

All the Patents and Patent Applications mentioned hereinbefore are deemed to be incorporated in the present Patent Application by reference.

We claim:

1. A polymer mixture which comprises
(A) an aromatic polycarbonate without polysiloxane blocks,
(B) (i) a styrene-containing copolymer, (ii) a styrene-containing graft polymer having a rubbery graft base, or (iii) a mixture of components (i) and (ii), and
(C) a polysiloxane-polycarbonate block copolymer built up from (a) 1–50% by weight of polysiloxane blocks of formula (II)

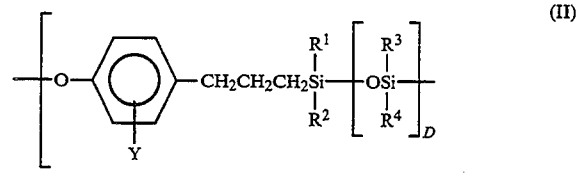

and (b) 50–99% by weight of blocks built up from 75–99% by weight of units having the formula (III)

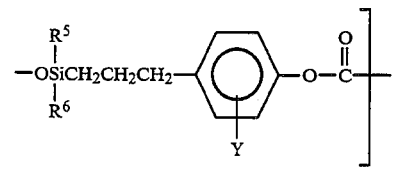

and from 1–25% by weight from aliphatic diester units of formula (IV):

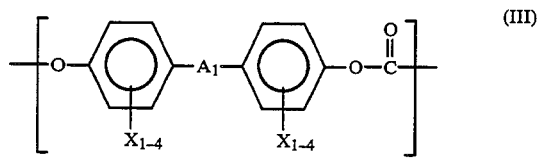

wherein, in formula II, R1, R2, R3, R4, R5 and R6 each independently of each other, represents a hydrogen atom, a hydrocarbyl or a halogenated hydrocarbyl, D is an integer from 5–140, Y is a hydrogen atom or an alkoxy, and wherein $A_1$ is a bivalent hydrocarbon group having 1-15 carbon atoms, which bivalent hydrocarbon group may be substituted; and —S—, and —S—S—; and —S(O)—; and —S(O)2—; and —O—, or a —C—, and every X, independently of each other, is a hydrogen atom, a halogen or a monovalent hydrocarbon and wherein $A_2$ is an alkylene radical having 6–18 carbon atoms.

2. Polymer mixture as claimed in claim 1 wherein, per 100 parts by weight of constituent A plus constituent B plus constituent C, the polymer mixture is built up from 50–90% by weight of constituent A and 2–40% by weight of constituent B and 2–40% by weight of constituent C, wherein constituent B comprises 50–100% by weight of the graft polymer and 0–50% by weight of the copolymer.

3. Polymer mixture as claimed in claim 1 wherein the content of polysiloxane blocks in constituent C plus the content of rubbery graft base in constituent B together, calculated with respect to the overall quantity by weight of the constituents A plus B plus C, lies between 2.5 and 25% by weight.

4. Polymer mixture as claimed in claim 1 wherein the graft polymer is obtained by grafting on the rubber graft base a mixture of (1) styrene, alpha-methyl styrene, a styrene substituted in the aromatic nucleus, or any mixture thereof and (2) a methacrylonitrile, acrylonitrile, maleic acid anhydride, a derivative of maleic acid anhydride, acrylic monomer, or a mixture thereof.

5. Polymer mixture as claimed in claim 1 wherein the copolymer is built up from units derived from (1) styrene, alpha-methyl styrene, a styrene substituted in the aromatic nucleus, or any mixture thereof and (2) a methacrylonitrile, acrylonitrile, maleic acid anhydride, a derivative of maleic acid anhydride, acrylic monomer, or any mixture thereof.

6. Polymer mixture as claimed in claim 1 wherein constituent B is a mixture of a styrene copolymer and a styrene graft polymer.

7. Articles formed from the polymer mixture as claimed in claim 1.

8. A polymer mixture as claimed in claim 1 further comprising additives selected from the group consisting of fillers, reinforcing fibers, stabilizers, pigments, dyes, plasticizers, mold-release agents, antistatic agents, or any mixtures thereof.

9. A method for making a polymer mixture comprising compounding (A) an aromatic polycarbonate without polysiloxane blocks, (B) a styrene-containing copolymer, (ii) a styrene-containing graft polymer having a rubber graft base, or (iii) a mixture of components (i) and (ii), and (C) a polysiloxane-polycarbonate block copolymer built up from (a) 1–50% by weight of polysiloxane blocks of formula (II)

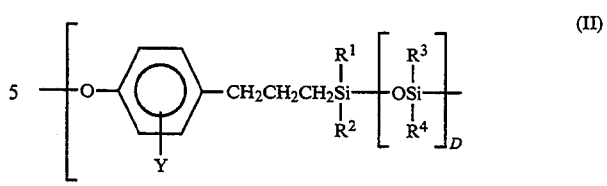

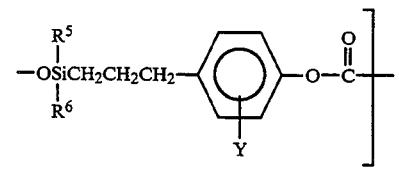

and (b) 50–99% by weight of blocks built up from 75–99% by weight of units having the formula (III)

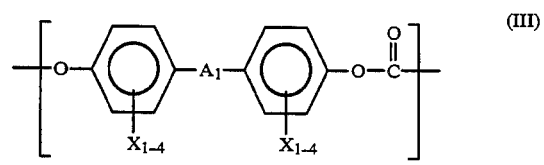

and from 1–25% by weight from aliphatic diester units of formula (IV):

wherein, in formula II, $R_1$, $R_2$, $R_3$, $R_4$, $R_5$ and $R_6$ each independently of each other, represent a hydrogen atom, a hydrocarbyl or a halogenated hydrocarbyl, D is an integer from 5–140, Y is a hydrogen atom or an alkoxy, and wherein $A_1$ is a bivalent hydrocarbon group having 1–15 carbon atoms, which bivalent hydrocarbon group may be substituted; an —S—; and —S—S—; an —S(O)—; an —S(O)$_2$—; an —O—, or a —C—, and every X, independently of each other, is a hydrogen atom, a halogen or a monovalent hydrocarbon and wherein $A_2$ is an alkylene radical having 6–18 carbon atoms forth.

10. A method as claimed in claim 9 further comprising additives selected from the group consisting of fillers, reinforcing fibers, stabilizers, pigments, dyes, plasticizers, mold-release agents, antistatic agents, or any mixtures thereof.

* * * * *

UNITED STATES PATENT AND TRADEMARK OFFICE
CERTIFICATE OF CORRECTION

PATENT NO. : 5,380,795
DATED : January 10, 1995
INVENTOR(S) : Johannes C. Gosens et al It is certified that error appears in the above-indentified patent and that said Letters Patent is hereby corrected as shown below:

On the title page: Item [75] Inventors:
Johannes C. Gosens, Roosendaal:, Adelbert H. L. Groothuis,
Bergen op Zoom;, Hendrikus J. E. Smits, Roosendaal. all of
Netherlands Signed and Sealed this Twenty-fifth Day of April, 1995

Attest:

BRUCE LEHMAN

*Attesting Officer*    *Commissioner of Patents and Trademarks*